Oct. 13, 1936.  M. ESNARD  2,057,233
FAUCET
Filed March 25, 1936
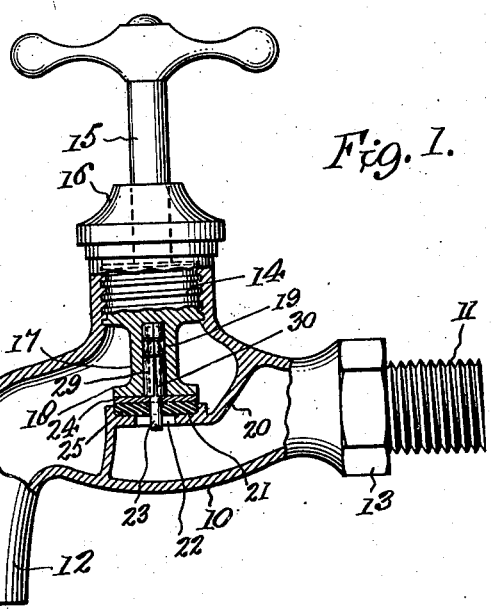
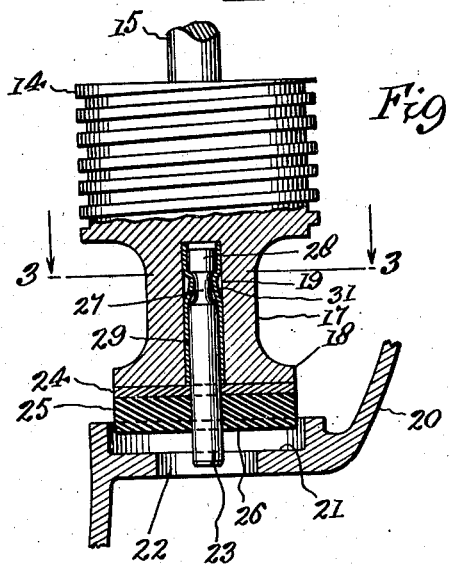
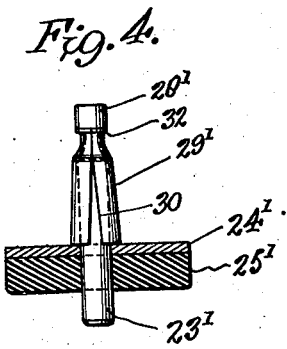
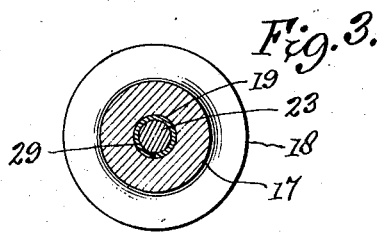
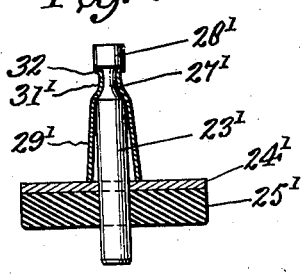
Inventor
M. Esnard
By Wilkinson & Mawhinney
Attorneys.

Patented Oct. 13, 1936

2,057,233

UNITED STATES PATENT OFFICE 2,057,233

FAUCET

Miguel Esnard, Matanzas, Cuba

Application March 25, 1936, Serial No. 70,872

5 Claims. (Cl. 251—46)

This invention relates to faucets or bibbs, and more particularly to an improved type of washer or gasket for a valve construction.

This invention is an improvement over the construction embodied in my prior Patent No. 1,896,944 dated February 7, 1933.

An object of this invention is to provide a readily replaceable washer or gasket which can be quickly inserted in the valve body in such a manner as to be swivelly secured therein and at the same time secured in such a manner that the washer or gasket will not chatter under pressure.

Another object of this invention is to provide an improved type of washer or gasket which is so constructed that it may be used with the present constructions of faucets or bibbs without altering the present construction and without requiring the use of tools.

With the foregoing and other objects in view, the invention will be more fully described hereinafter, and will be more particularly pointed out in the claims appended hereto.

In the drawing, wherein like symbols refer to like or corresponding parts throughout the several views:

Figure 1 is a detail side elevation, partly broken away and in section, of a faucet having an improved type of washer or gasket embodied therein.

Figure 2 is an enlarged fragmentary vertical section of the valve body and the valve seat.

Figure 3 is a sectional view taken on the line 3—3 of Fig. 2.

Figure 4 is a detail side elevation, partly in section of a modified form of washer or gasket.

Figure 5 is a vertical section of the modified form of washer shown in Fig. 4.

Referring to the drawing, and first to Figs. 1 to 3 inclusive, the numeral 10 designates generally the shell or housing of a faucet which is provided with a threaded nipple 11 at one end, a discharge nozzle 12 at the opposite end, and with a nut portion 13 adjacent the nipple 11.

A valve body 14 is threaded into the housing 10 and is provided with a stem 15 extending through a gland 16. The body 14 has a reduced axially disposed stud 17 on the inner end thereof which terminates at the lower end in an annular flange 18. The stud 17 is provided with a cylindrical bore 19 which opens through the lower end thereof, and this bore in present valve constructions is usually threaded to receive a bolt or screw in order to hold the washer against the under side of the flange 18.

The casing 10 is provided with a partition 20 having a valve seat 21 and a passage 22 axially of the seat 21. This seat 21 may be flat as shown, or may have an annular rib, it being understood that the hereinafter described construction may be combined with any of the present types of faucets and that the faucet shown in the drawing is only illustrative of one of the types with which the present invention may be used.

In order to provide a sealing means in the form of a washer or gasket for engagement on the seat 21, I have provided a stem 23 which fits loosely in the bore 19, and a plate 24 is fixed to the stem 23 intermediate the ends thereof and bears against the inner end of the stud 17 and the flange 18. A yieldable gasket or washer 25 is mounted on the stem 23, being provided with an axial opening 26 which is of such a size that the inherent resiliency of the washer 25 will maintain the washer on the stem 23, although of course if desired the upper side of the washer 25 may be cemented or otherwise fastened to the under surface of the plate 25.

The stem 23 has a reduced neck 27 adjacent the upper end thereof, and a head 28 at the upper end. The stem 23 is frictionally held in the bore 19 by means of a cage 29 which encloses the stem 23. The cage 29 comprises a substantially tubular shaped body which is split longitudinally as at 30, and provided with a constricted portion 31 engaging about the neck 27. The inside diameter of the cage 29 when disposed within the bore 19 is slightly larger than the diameter of the stem 23, so that the constricted portion 31 will swivelly maintain the stem 23 within the bore 19. Preferably the cage 29 is initially flared from the constricted portion 31 to the lower end thereof so that cage 29 will tightly fit in the bore 19 although the stem 23 may freely rotate relative to the valve body 14 and the stud 17.

In the modification shown in Figs. 4 and 5, the stem 23', the plate 24' and the washer 25' are similar to the construction shown in Figs. 1 to 3. A split cage 29' is disposed about the stem 23' and is provided with a constricted upper portion 31' loosely engaging about the neck 27' of the stem 23'. The upper end of the constricted portion 31' terminates in a shoulder or annular flange 32 which engages against the under side of the head 28'. When the construction here shown is inserted into the bore of the valve body the cage 29' will assume a substantially cylindrical configuration, the cage 29' being initially flared so that the outer surface of the cage 29' will frictionally maintain the washer construction, including the stem 23', plate 24' and gasket 25', within the bore of the valve body.

The hereinbefore described washer construction may be inserted in the bore 19 by removing the valve body 14 and then placing the assembly, including the stem 23, plate 24, gasket 25, and cage 29, within the housing 10 with the gasket 25 engaging upon the seat 21. The valve body 14 may then be threaded into the housing 10, and the insertion of the body 14 into the housing 10 will force the cage 29 upwardly into the bore 19 until the plate 24 contacts with the lower end of the stud 17 and the flange 18. The plate 24 will provide a bearing surface for the washer construction so that the gasket 25 may remain stationary during the final tightening of the valve body 14 and during the initial movement of the valve body 14 to open position. From the foregoing it will be evident that the washer construction may be mounted in the valve body without the use of tools. If desired the washer construction may be forced into the bore 19 of the valve body before the latter is reinserted in the housing 10.

It is of course understood that various changes and modifications may be made in the details of construction of the above specifically described invention, such changes and modifications being limited only by the scope of the appended claims.

What is claimed is:

1. A washer construction insertable in a bore of a valve body, comprising a stem having an annular groove adjacent the upper end thereof, a plate fixed to the stem, a yieldable gasket about the stem and engaging against one side of the plate, a substantially tubular cage member disposed loosely about the stem, and a constricted portion carried by the cage member engaging in said groove to swivelly secure the stem within the cage member.

2. As a new article of manufacture, a washer construction insertable in a bore of a valve body, comprising a stem, a plate fixed to the stem, a yieldable gasket about the stem and engaging against one side of the plate, a substantially tubular cage member, a reduced neck carried by the upper end of the stem, said cage member having a constricted upper portion loosely engaging the neck whereby to swivelly secure the stem within the cage member.

3. A renewable washer construction for a valve body, comprising a stem, a plate fixed to the stem, a yieldable gasket about the stem and engaging against one side of the plate, a split cage member loosely engaging about the stem, a reduced neck carried by the stem downwardly of the upper end thereof, and a constricted portion carried by the cage member engaging within said neck to swivelly secure the stem within the cage member.

4. A renewable washer construction for a valve body, comprising a stem, a plate fixed to the stem intermediate the ends thereof, a yieldable gasket mounted on the stem and engaging against one side of the plate, a reduced neck carried by the upper end of the stem, a head disposed above the neck and integral with the stem, and a cage member engaging loosely about the stem, neck and head, said cage member having a flared lower portion and a constricted intermediate portion, said constricted intermediate portion loosely engaging about the neck whereby to swivelly secure the stem within the cage member.

5. A renewable washer construction for a valve body, comprising a stem, a plate fixed to the stem intermediate the ends thereof, a yieldable gasket mounted on the stem and engaging against one side of the plate, a reduced neck carried by the upper end of the stem, a head disposed above the neck and integral with the stem, and a cage member engaging loosely about the stem and neck, said cage member comprising a substantially tubular body split longitudinally and flaring in a downward direction, and a constricted upper portion loosely engaging about said neck, said constricted portion terminating in an annular flange engaging against the underside of said head.

MIGUEL ESNARD.